United States Patent
Hergesheimer

(10) Patent No.: US 11,022,671 B2
(45) Date of Patent: Jun. 1, 2021

(54) SYSTEMS AND METHODS FOR TRACKING MULTIPLE COLLOCATED ASSETS

(71) Applicant: CalAmp Corp., Irvine, CA (US)

(72) Inventor: Peter Hergesheimer, Encinitas, CA (US)

(73) Assignee: CalAmp Corp, Irvine, CA (US)

( * ) Notice: Subject to any disclaimer, the term of this patent is extended or adjusted under 35 U.S.C. 154(b) by 0 days.

(21) Appl. No.: 16/883,658

(22) Filed: May 26, 2020

(65) Prior Publication Data

US 2020/0393533 A1 Dec. 17, 2020

Related U.S. Application Data

(63) Continuation of application No. 16/681,170, filed on Nov. 12, 2019, now abandoned, which is a continuation of application No. 15/373,277, filed on Dec. 8, 2016, now Pat. No. 10,473,750.

(51) Int. Cl.
*H04W 24/00* (2009.01)
*G01S 5/02* (2010.01)
*G01S 11/06* (2006.01)

(52) U.S. Cl.
CPC .......... *G01S 5/0294* (2013.01); *G01S 5/0252* (2013.01); *G01S 5/0284* (2013.01); *G01S 11/06* (2013.01)

(58) Field of Classification Search
CPC ...... G01S 5/0294; G01S 11/06; G01S 5/0284; G01S 5/0252
USPC ............. 455/456.1–456.3; 370/338
See application file for complete search history.

(56) References Cited

U.S. PATENT DOCUMENTS

| 4,497,025 | A | 1/1985 | Hannoyer |
| 4,549,277 | A | 10/1985 | Brunson et al. |
| 5,058,020 | A | 10/1991 | Matsuda |
| 5,117,375 | A | 5/1992 | Worcester et al. |
| 5,251,161 | A | 10/1993 | Gioutsos et al. |
| 5,253,173 | A | 10/1993 | Drobny et al. |

(Continued)

FOREIGN PATENT DOCUMENTS

| EP | 2056298 A1 | 5/2009 |
| EP | 2083276 A1 | 7/2009 |

(Continued)

OTHER PUBLICATIONS

Surface Vehicle Recommended Practice, E/E Diagnostic Test Modes, Dec. 1991, 32 pgs.

(Continued)

*Primary Examiner* — Marcos Batista
(74) *Attorney, Agent, or Firm* — Barnes & Thornburg LLP

(57) ABSTRACT

Systems and methods for locating collocated assets in accordance with embodiments of the invention are disclosed. In one embodiment of the invention, an asset tracking device includes a processor, a memory connected to the processor, and a communications device connected to the processor, wherein the processor obtains asset signal data, where the asset signal strength data includes asset data identifying an asset, calculates asset signal strength data based on the obtained asset signal data, and determines chained asset data based on the asset signal data and the asset signal strength data, where the chained asset data identifies a set of assets chained to a master asset associated with the asset tracking device.

20 Claims, 9 Drawing Sheets

(56) References Cited

U.S. PATENT DOCUMENTS

| | | |
|---|---|---|
| 5,337,238 A | 8/1994 | Gioutsos et al. |
| 5,339,242 A | 8/1994 | Jensen et al. |
| 5,519,613 A | 5/1996 | Gioutsos et al. |
| 5,559,699 A | 9/1996 | Gioutsos et al. |
| 5,563,791 A | 10/1996 | Gioutsos et al. |
| 5,587,906 A | 12/1996 | Muckley et al. |
| 5,588,005 A * | 12/1996 | Ali .................. B61L 25/021 370/346 |
| 5,684,701 A | 11/1997 | Breed et al. |
| 5,754,115 A | 5/1998 | Woo |
| 5,754,849 A | 5/1998 | Dyer et al. |
| 5,758,301 A | 5/1998 | Saito et al. |
| 5,767,766 A | 6/1998 | Kwun |
| 5,780,782 A | 7/1998 | O'Dea et al. |
| 5,805,460 A | 9/1998 | Greene et al. |
| 5,825,283 A | 10/1998 | Camhi |
| 5,841,201 A | 11/1998 | Ibaraki et al. |
| 5,862,511 A | 1/1999 | Croyle et al. |
| 5,874,675 A | 2/1999 | Edmans et al. |
| 5,978,722 A | 11/1999 | Takasuka et al. |
| 6,029,111 A | 2/2000 | Croyle |
| 6,076,028 A | 6/2000 | Donnelly et al. |
| 6,085,151 A | 7/2000 | Farmer et al. |
| 6,163,690 A | 12/2000 | Lilja |
| 6,236,921 B1 | 5/2001 | McConnell |
| 6,269,290 B1 | 7/2001 | Tsuji et al. |
| 6,308,134 B1 | 10/2001 | Croyle et al. |
| 6,337,653 B1 | 1/2002 | Buchler et al. |
| 6,346,876 B1 | 2/2002 | Flick |
| 6,356,841 B1 | 3/2002 | Hamrick et al. |
| 6,363,308 B1 | 3/2002 | Petti et al. |
| 6,392,527 B1 | 5/2002 | Gitano et al. |
| 6,401,027 B1 | 6/2002 | Xu et al. |
| 6,417,802 B1 | 7/2002 | Diesel et al. |
| 6,431,593 B1 | 8/2002 | Cooper et al. |
| 6,438,475 B1 | 8/2002 | Gioutsos et al. |
| 6,532,419 B1 | 3/2003 | Begin |
| 6,540,255 B1 | 4/2003 | Garcia et al. |
| 6,611,755 B1 | 8/2003 | Coffee et al. |
| 6,737,989 B2 | 5/2004 | Flick |
| 6,756,885 B1 | 6/2004 | Flick |
| 6,812,888 B2 | 11/2004 | Drury et al. |
| 6,832,140 B2 | 12/2004 | Fan et al. |
| 6,912,557 B1 | 6/2005 | North et al. |
| 7,015,830 B2 | 3/2006 | Flick |
| 7,020,501 B1 | 3/2006 | Elliott et al. |
| 7,050,897 B2 | 5/2006 | Breed et al. |
| 7,085,637 B2 | 8/2006 | Breed et al. |
| 7,110,880 B2 | 9/2006 | Breed et al. |
| 7,158,016 B2 | 1/2007 | Cuddihy et al. |
| 7,250,850 B2 | 7/2007 | Mizutani |
| 7,272,493 B1 | 9/2007 | Hamrick et al. |
| 7,286,929 B2 | 10/2007 | Staton et al. |
| 7,348,895 B2 | 3/2008 | Lagassey et al. |
| 7,366,608 B2 | 4/2008 | Hamrick et al. |
| 7,460,954 B2 | 12/2008 | Hamrick et al. |
| 7,484,756 B2 | 2/2009 | Chou et al. |
| 7,527,288 B2 | 5/2009 | Breed et al. |
| 7,577,525 B2 | 8/2009 | Hamrick et al. |
| 7,607,510 B1 | 10/2009 | Mun et al. |
| 7,643,919 B2 | 1/2010 | Nicaise |
| 7,671,727 B2 | 3/2010 | Flick |
| 7,725,218 B2 | 5/2010 | Hamrick et al. |
| 7,765,039 B1 | 7/2010 | Hagenbuch |
| 7,767,766 B2 | 8/2010 | Tilbrook |
| 7,805,231 B2 | 9/2010 | Cluff et al. |
| 7,805,276 B1 | 9/2010 | Byers et al. |
| 8,004,397 B2 | 8/2011 | Forrest et al. |
| 8,010,251 B2 | 8/2011 | Hamrick et al. |
| 8,032,278 B2 | 10/2011 | Flick |
| 8,065,342 B1 | 11/2011 | Borg et al. |
| 8,155,841 B2 | 4/2012 | Erb |
| 8,330,626 B1 | 12/2012 | Adelson |
| 8,489,271 B2 | 7/2013 | Hergesheimer et al. |
| 8,688,380 B2 | 4/2014 | Cawse et al. |
| 8,749,350 B2 | 6/2014 | Geisler et al. |
| 8,762,009 B2 | 6/2014 | Ehrman et al. |
| 8,799,034 B1 | 8/2014 | Brandmaier et al. |
| 8,812,173 B2 | 8/2014 | Chen et al. |
| 8,855,143 B1 | 10/2014 | Acampora |
| 8,874,279 B2 | 10/2014 | Frye et al. |
| 8,996,240 B2 | 3/2015 | Plante |
| 9,002,538 B2 | 4/2015 | Hergesheimer et al. |
| 9,171,460 B2 | 10/2015 | Chen |
| 9,179,497 B1 | 11/2015 | Teixeira et al. |
| 9,217,757 B2 | 12/2015 | Hergesheimer et al. |
| 9,406,222 B2 | 8/2016 | Hergesheimer et al. |
| 9,457,754 B1 | 10/2016 | Christensen et al. |
| 9,459,277 B2 | 10/2016 | Hergesheimer et al. |
| 9,491,420 B2 | 11/2016 | Mimar |
| 9,644,977 B2 | 5/2017 | Camisa |
| 9,648,579 B2 | 5/2017 | Abhishek |
| 10,055,909 B2 | 8/2018 | Jenkins et al. |
| 10,102,689 B2 | 10/2018 | Hergesheimer et al. |
| 10,107,831 B2 | 10/2018 | Hergesheimer et al. |
| 10,219,117 B2 | 2/2019 | Hergesheimer et al. |
| 10,304,264 B2 | 5/2019 | Camisa |
| 2002/0013648 A1 | 1/2002 | Feser et al. |
| 2002/0065045 A1 | 5/2002 | Kim et al. |
| 2002/0100310 A1 | 8/2002 | Begin |
| 2002/0124166 A1 | 9/2002 | Lee et al. |
| 2002/0135167 A1 | 9/2002 | Mattes et al. |
| 2003/0001368 A1 | 1/2003 | Breed et al. |
| 2003/0005117 A1 | 1/2003 | Kang et al. |
| 2003/0028766 A1 | 2/2003 | Gass et al. |
| 2003/0151507 A1 | 8/2003 | Andre et al. |
| 2003/0176959 A1 | 9/2003 | Breed et al. |
| 2003/0236970 A1 | 12/2003 | Palmer et al. |
| 2004/0036261 A1 | 2/2004 | Breed et al. |
| 2004/0075539 A1 | 4/2004 | Savoie et al. |
| 2004/0088090 A1 | 5/2004 | Wee |
| 2004/0132500 A1 | 7/2004 | Roqalski et al. |
| 2004/0142659 A1 | 7/2004 | Oesterling |
| 2004/0155790 A1 | 8/2004 | Tsuji et al. |
| 2004/0171378 A1 | 9/2004 | Rautila et al. |
| 2004/0257208 A1 | 12/2004 | Huang et al. |
| 2005/0065711 A1 | 3/2005 | Dahlqren et al. |
| 2005/0071314 A1 | 3/2005 | Caron |
| 2005/0099289 A1 | 5/2005 | Arita et al. |
| 2005/0240343 A1 | 10/2005 | Schmidt et al. |
| 2005/0267947 A1 | 12/2005 | Patrick et al. |
| 2005/0273516 A1 | 12/2005 | Patrick et al. |
| 2005/0283286 A1 | 12/2005 | Kanda et al. |
| 2006/0022469 A1 | 2/2006 | Syed et al. |
| 2006/0031432 A1 | 2/2006 | Patrick et al. |
| 2006/0034237 A1 | 2/2006 | Patrick et al. |
| 2006/0041336 A1 | 2/2006 | Schubert et al. |
| 2006/0047459 A1 | 3/2006 | Underbrink et al. |
| 2006/0050953 A1 | 3/2006 | Farmer et al. |
| 2006/0199537 A1 | 9/2006 | Eisenbach et al. |
| 2007/0027612 A1 | 2/2007 | Barfoot et al. |
| 2007/0109117 A1 | 5/2007 | Heitzmann et al. |
| 2007/0229251 A1 | 10/2007 | Ehrman et al. |
| 2007/0257791 A1 | 11/2007 | Arita et al. |
| 2007/0266078 A1 | 11/2007 | Rittle et al. |
| 2007/0271014 A1 | 11/2007 | Breed |
| 2007/0299587 A1 | 12/2007 | Breed et al. |
| 2008/0111666 A1 | 5/2008 | Plante et al. |
| 2008/0114545 A1 | 5/2008 | Takaoka et al. |
| 2008/0128600 A1 | 6/2008 | Ogisu et al. |
| 2008/0150707 A1 | 6/2008 | Shamoto |
| 2008/0195261 A1 | 8/2008 | Breed |
| 2008/0202199 A1 | 8/2008 | Finley et al. |
| 2008/0211666 A1 | 9/2008 | Saidi et al. |
| 2008/0211914 A1 | 9/2008 | Herrera et al. |
| 2008/0275601 A1 | 11/2008 | Saito et al. |
| 2008/0281618 A1 | 11/2008 | Mermet et al. |
| 2009/0015392 A1 | 1/2009 | Takahashi et al. |
| 2009/0037056 A1 | 2/2009 | Erb |
| 2009/0077229 A1 | 3/2009 | Ebbs |
| 2009/0217163 A1 | 8/2009 | Jaroker |
| 2009/0217733 A1 | 9/2009 | Stachow |
| 2009/0221320 A1 | 9/2009 | Walley et al. |
| 2009/0249858 A1 | 10/2009 | Ishikawa et al. |

(56) References Cited

U.S. PATENT DOCUMENTS

| | | |
|---|---|---|
| 2010/0039216 A1 | 2/2010 | Knight et al. |
| 2010/0039247 A1 | 2/2010 | Ziegler et al. |
| 2010/0039318 A1 | 2/2010 | Kmiecik et al. |
| 2010/0042286 A1 | 2/2010 | Lich |
| 2010/0097316 A1 | 4/2010 | Shaw et al. |
| 2010/0122246 A1 | 5/2010 | Gesquiere et al. |
| 2010/0185524 A1 | 7/2010 | Watkins |
| 2010/0205427 A1 | 8/2010 | Bauer et al. |
| 2010/0231002 A1 | 9/2010 | Yoshioka et al. |
| 2010/0235433 A1 | 9/2010 | Ansari et al. |
| 2010/0241838 A1 | 9/2010 | Cohen et al. |
| 2010/0273422 A1 | 10/2010 | Garrett et al. |
| 2010/0279647 A1 | 11/2010 | Jacobs et al. |
| 2010/0312473 A1 | 12/2010 | Hoshizaki |
| 2010/0318257 A1 | 12/2010 | Kalinadhabhotla |
| 2011/0004444 A1 | 1/2011 | Farrow et al. |
| 2011/0060496 A1 | 3/2011 | Nielsen et al. |
| 2011/0106373 A1 | 5/2011 | Hergesheimer et al. |
| 2011/0109438 A1 | 5/2011 | Dijkstra et al. |
| 2011/0130906 A1 | 6/2011 | Mayer |
| 2011/0153367 A1 | 6/2011 | Amigo |
| 2011/0202225 A1 | 8/2011 | Willis et al. |
| 2011/0202305 A1 | 8/2011 | Willis et al. |
| 2011/0218710 A1 | 9/2011 | Trinh et al. |
| 2011/0238289 A1 | 9/2011 | Lehmann et al. |
| 2011/0264393 A1 | 10/2011 | An |
| 2011/0307205 A1 | 12/2011 | Vassilieff |
| 2011/0320088 A1 | 12/2011 | Eom et al. |
| 2012/0022780 A1 | 1/2012 | Kulik et al. |
| 2012/0035881 A1 | 2/2012 | Rubin |
| 2012/0041618 A1 | 2/2012 | Sun et al. |
| 2012/0050095 A1 | 3/2012 | Scherzinger |
| 2012/0072078 A1 | 3/2012 | Oosaki |
| 2012/0116669 A1 | 5/2012 | Lee |
| 2012/0146766 A1 | 6/2012 | Geisler et al. |
| 2012/0155389 A1 | 6/2012 | Mcnamee et al. |
| 2012/0158211 A1 | 6/2012 | Chen et al. |
| 2012/0159142 A1 | 6/2012 | Jibbe et al. |
| 2012/0233668 A1 | 9/2012 | Leafe et al. |
| 2012/0253585 A1 | 10/2012 | Harvie |
| 2012/0253892 A1 | 10/2012 | Davidson |
| 2012/0259526 A1 | 10/2012 | Inoue |
| 2012/0303203 A1 | 11/2012 | Olsen et al. |
| 2012/0331181 A1 | 12/2012 | Govande et al. |
| 2013/0002415 A1 | 1/2013 | Walli |
| 2013/0013907 A1 | 1/2013 | Marino et al. |
| 2013/0024202 A1 | 1/2013 | Harris |
| 2013/0030811 A1 | 1/2013 | Olleon et al. |
| 2013/0038439 A1 | 2/2013 | Saito et al. |
| 2013/0073142 A1 | 3/2013 | Herqesheimer et al. |
| 2013/0095841 A1 | 4/2013 | Quimby et al. |
| 2013/0148554 A1 | 6/2013 | Chen et al. |
| 2013/0182693 A1 | 7/2013 | Sperling et al. |
| 2013/0204572 A1 | 8/2013 | Sato |
| 2013/0244210 A1 | 9/2013 | Nath et al. |
| 2013/0249713 A1 | 9/2013 | Adelson |
| 2013/0275001 A1 | 10/2013 | Hergesheimer et al. |
| 2013/0288659 A1 | 10/2013 | Hrabak et al. |
| 2013/0297137 A1 | 11/2013 | Fushiki et al. |
| 2013/0302756 A1 | 11/2013 | Takeuchi |
| 2013/0320654 A1 | 12/2013 | Clark et al. |
| 2013/0338855 A1 | 12/2013 | Mason |
| 2014/0069837 A1 | 3/2014 | Naruishi et al. |
| 2014/0074353 A1 | 3/2014 | Lee et al. |
| 2014/0075197 A1 | 3/2014 | Alrabady et al. |
| 2014/0094210 A1 | 4/2014 | Gellens et al. |
| 2014/0111354 A1 | 4/2014 | Hergesheimer et al. |
| 2014/0118132 A1 | 5/2014 | Braunberqer et al. |
| 2014/0142886 A1 | 5/2014 | Hergesheimer et al. |
| 2014/0143940 A1 | 5/2014 | Iuliano et al. |
| 2014/0149145 A1 | 5/2014 | Peng |
| 2014/0173581 A1 | 6/2014 | Grinberg et al. |
| 2014/0180529 A1 | 6/2014 | Simon et al. |
| 2014/0189335 A1 | 7/2014 | Liu et al. |
| 2014/0236518 A1 | 8/2014 | Hergesheimer et al. |
| 2014/0236519 A1 | 8/2014 | Hergesheimer et al. |
| 2014/0237463 A1 | 8/2014 | Sriram et al. |
| 2014/0300739 A1 | 10/2014 | Mimar |
| 2014/0303836 A1 | 10/2014 | Phelan et al. |
| 2014/0309843 A1 | 10/2014 | Chen et al. |
| 2014/0357295 A1* | 12/2014 | Skomra ............... H04W 4/02 |
| | | 455/456.1 |
| 2014/0358394 A1 | 12/2014 | Picciotti |
| 2014/0379208 A1 | 12/2014 | McQuade et al. |
| 2015/0015385 A1 | 1/2015 | Tomita et al. |
| 2015/0051796 A1 | 2/2015 | Levy |
| 2015/0105099 A1* | 4/2015 | Luo .................. H04W 64/003 |
| | | 455/456.1 |
| 2015/0149218 A1 | 5/2015 | Bayley et al. |
| 2015/0161391 A1 | 6/2015 | Johnsen et al. |
| 2015/0248731 A1 | 9/2015 | Fernandes et al. |
| 2015/0268059 A1 | 9/2015 | Borqhesani |
| 2015/0271271 A1 | 9/2015 | Bullotta et al. |
| 2015/0271299 A1 | 9/2015 | Bullotta et al. |
| 2015/0339241 A1 | 11/2015 | Warner et al. |
| 2016/0094964 A1 | 3/2016 | Barfield et al. |
| 2016/0133130 A1 | 5/2016 | Grimm et al. |
| 2016/0146615 A1 | 5/2016 | Abhishek |
| 2016/0162284 A1 | 6/2016 | Meng et al. |
| 2016/0173281 A1 | 6/2016 | White et al. |
| 2016/0335813 A1 | 11/2016 | Hergesheimer et al. |
| 2016/0341559 A1 | 11/2016 | Camisa |
| 2016/0362075 A1 | 12/2016 | Dlaqnekov |
| 2017/0017766 A1 | 1/2017 | Giraud |
| 2017/0023610 A1 | 1/2017 | Hergesheimer et al. |
| 2017/0147331 A1 | 5/2017 | Liem et al. |
| 2017/0236339 A1 | 8/2017 | Camisa |
| 2017/0242678 A1 | 8/2017 | Sangameswaran et al. |
| 2017/0308705 A1 | 10/2017 | Karaginides et al. |
| 2018/0012429 A1 | 1/2018 | Jenkins et al. |
| 2018/0053354 A1 | 2/2018 | Jenkins et al. |
| 2018/0088963 A1 | 3/2018 | Arora et al. |
| 2018/0103355 A1 | 4/2018 | Hergesheimer et al. |
| 2018/0145991 A1 | 5/2018 | Mccauley et al. |
| 2019/0018669 A1 | 1/2019 | Cook et al. |
| 2019/0141156 A1 | 5/2019 | Srinivasulu |

FOREIGN PATENT DOCUMENTS

| | | | |
|---|---|---|---|
| EP | 2959376 A1 | 12/2015 | |
| EP | 2923277 B1 | 9/2017 | |
| EP | 2959376 B1 | 7/2018 | |
| GB | 2506365 A | 4/2014 | |
| JP | 2007178295 A | 7/2007 | |
| KR | 2009-P04512 | * 9/2009 | ............... H04W 4/02 |
| WO | 20000017607 | 3/2000 | |
| WO | 20020018873 | 3/2002 | |
| WO | 2013076695 A1 | 5/2013 | |
| WO | 2014049352 A1 | 4/2014 | |
| WO | 2014081485 | 5/2014 | |
| WO | 2014130077 A1 | 8/2014 | |
| WO | 2014130078 A1 | 8/2014 | |
| WO | 2014202110 A1 | 12/2014 | |
| WO | 2015121639 A1 | 8/2015 | |
| WO | 2015183677 A1 | 12/2015 | |
| WO | 2016081901 | 5/2016 | |
| WO | 2016191306 | 12/2016 | |
| WO | 2016200589 | 12/2016 | |
| WO | 2018035065 A1 | 2/2018 | |

OTHER PUBLICATIONS

SAE International Surface Vehicle Recommended Practice, "E/E Diagnostic Test Modes", SAE Standard J1979, Issued Dec. 1, 1991, 19 pgs.

Surface Vehicle Recommended Practice; OBD II Scan Tool, Mar. 1992, 14 pgs.

SAE International Surface Vehicle Recommended Practice, "OBD II Scan Tool", SAE Standard J1978, Issued Mar. 1, 1992, 13 pgs.

Surface Vehicle Recommended Practice, Universal Interface for OBD II Scan, Jun. 30, 1993, 45 pgs.

(56) References Cited

OTHER PUBLICATIONS

Road vehicles—Diagnostic Systems—Part 2: CARB requirements for interchange of digital information, ISO 9141-2, 1994, 18 pgs.
ETSI, "GSM Technical Specification", GSM 07.07, Version 5.0.0, Jul. 1, 1996, 77 pgs.
Memsic 2125 Dual-Axis Accelerometer (#28017) Data Sheet (Parallax Inc., v2.0 Jan. 29, 2009).
International Search Report and Written Opinion for International Application No. PCT/US13/54939, Completed Feb. 5, 2014, dated Feb. 24, 2014, 5 pgs.
International Search Report and Written Opinion for International Application No. PCT/US2013/054956, International Filing Date Aug. 14, 2013, Search Completed Feb. 11, 2014, dated Mar. 6, 2014, 9 pgs.
International Search Report and Written Opinion for International Application No. PCT/US13/54943, Completed Feb. 13, 2014, dated Feb. 27, 2014, 6 pgs.
International Preliminary Report on Patentability for International Application PCT/US2013/054956, Report dated May 26 2015, dated Jun. 4, 2015, 9 Pgs.
International Preliminary Report on Patentability for International Application PCT/US2013/054939, dated Aug. 25, 2015, dated Sep. 3, 2015, 4 Pgs.
International Preliminary Report on Patentability for International Application PCT/US2013/054943, dated Aug. 25, 2015, dated Sep. 3, 2015, 6 Pgs.
International Search Report and Written Opinion for International Application No. PCT/US2015/061990, completed Jan. 12, 2016, dated Feb. 4, 2016, 6 Pgs.
International Search Report and Written Opinion for International Application No. PCT/US2016/033625, Search completed Jul. 19, 2016, dated Aug. 18, 2016, 7 Pgs.
International Search Report and Written Opinion for International Application No. PCT/US2016/033621, completed Jul. 28, 2016, dated Aug. 5, 2016, 11 Pgs.
Extended European Search Report for European Application No. 13875407.2, Search completed Nov. 22, 2016, dated Nov. 30, 2016, 7 Pgs.
Extended European Search Report for European Application No. 13875911.3, Search completed Nov. 22, 2016, dated Dec. 9, 2016, 6 Pgs.
Extended European Search Report for European Application No. 17160719.5, Search completed Apr. 6, 2017, dated Apr. 18, 2017, 6 Pgs.
International Search Report and Written Opinion for International Application No. PCT/US2017/040763, Search completed Aug. 22, 2017, dated Sep. 8, 2017, 15 Pgs.
International Search Report and Written Opinion for International Application No. PCT/US2017/046824, Search completed Oct. 13, 2017, dated Oct. 27, 2017, 10 Pgs.
International Preliminary Report on Patentability for International Application PCT/US2016/033621, Report dated Nov. 28, 2017, dated Dec. 7, 2017, 7 Pgs.
International Preliminary Report on Patentability for International Application No. PCT/US2017/046824, Report dated Feb. 19, 2019, dated Feb. 28, 2019, 9 Pgs.

* cited by examiner

SYSTEMS AND METHODS FOR TRACKING MULTIPLE COLLOCATED ASSETS

CROSS REFERENCE TO RELATED APPLICATIONS

The current application is a continuation of U.S. patent application Ser. No. 16/681,170 entitled "Systems and Methods for Tracking Multiple Collocated Assets" to Peter Hergesheimer, filed Nov. 12, 2019, which is a continuation of U.S. patent application Ser. No. 15/373,277 entitled "Systems and Methods for Tracking Multiple Collocated Assets" to Peter Hergesheimer, filed Dec. 8, 2016 and issued on Nov. 12, 2019 as U.S. Pat. No. 10,473,750, the disclosures of which are hereby incorporated by reference in their entireties.

FIELD OF THE INVENTION

The present invention relates to determining location and more specifically to determining the location of an asset.

BACKGROUND

A Global Positioning System (GPS) is a space-based global navigation satellite system that utilizes a network of geo-synchronous satellites that can be utilized by a GPS receiver to determine its location. Many telematics systems incorporate a Global Positioning System (GPS) receiver that can be used to obtain the location of a vehicle at a certain measured time. Using the signals received by the GPS receiver, the heading information of the vehicle can be determined. A GPS receiver can determine velocity information in a variety of ways including, but not limited to, measuring the Doppler shift of the received signals and by comparing the location of a vehicle at a plurality of measured times. The acceleration of the vehicle can be determined as the change in speed divided by the time between the measurements. A GPS receiver's ability to determine acceleration can be limited due to the dependence of the measurement upon factors such as, but not limited to, reception and satellite availability. In addition to location information, a GPS receiver can also be configured to provide time data. However, measurements determined via a GPS receiver can contain errors that affect the accuracy of the measured information. In particular, GPS signals are vulnerable to signal delays, inconsistencies of atmospheric conditions that affect the speed of the GPS signals as they pass through the Earth's atmosphere, and multipath distortions. Additionally, other factors not listed above can influence GPS signals and result in measurement errors.

Telematics is the integrated use of telecommunications and informatics. Telematics units are installed in vehicles to provide a variety of telematics functionality in the vehicle. This functionality includes, but is not limited to, emergency warning systems, navigation functionality, safety warnings, and automated driving assistance. Telematics units are also capable of recording data related to the operation of the vehicle and providing that information for analysis, whether in real-time or during a time when the vehicle is being serviced. This information can be used in a variety of applications, such as fleet tracking, shipment tracking, insurance calculations, and in vehicle management and service.

SUMMARY OF THE INVENTION

Systems and methods for locating collocated assets in accordance with embodiments of the invention are disclosed. In one embodiment of the invention, an asset tracking device includes a processor, a memory connected to the processor, and a communications device connected to the processor, wherein the processor obtains asset signal data, where the asset signal strength data includes asset data identifying an asset, calculates asset signal strength data based on the obtained asset signal data, and determines chained asset data based on the asset signal data and the asset signal strength data, where the chained asset data identifies a set of assets chained to a master asset associated with the asset tracking device.

In yet another embodiment of the invention, the processor determines the location of the asset relative to the asset tracking device based on the asset signal strength data.

In an additional embodiment of the invention, the asset tracking device further includes a location determination device connected to the processor and the processor further determines absolute location data using the location determination device.

In yet another additional embodiment of the invention, the processor further determines the absolute location of the asset based on the absolute location data and the asset signal strength data.

In still another additional embodiment of the invention, the processor further transmits the chained asset data to a remote server system using the communications device.

In yet still another additional embodiment of the invention, the communications device includes a cellular modem.

In yet another embodiment of the invention, the communications device includes a radio frequency transceiver and the asset signal data is received using the communications device.

In still another embodiment of the invention, the radio frequency transceiver includes a Bluetooth Low Energy radio.

In yet still another embodiment of the invention, the asset signal data further includes synchronization data and the processor determines the chained asset data based on the synchronization data.

In yet another additional embodiment of the invention, the synchronization data includes brake lighting system voltage data.

In still another additional embodiment of the invention, the synchronization data includes counter data.

In yet still another additional embodiment of the invention, the asset tracking device includes a diagnostic connector and the asset tracking device is connected to a vehicle diagnostic connector in an asset.

Yet another embodiment of the invention includes an asset tracking system including a set of asset tracking devices, wherein each asset tracking device includes a processor, a memory connected to the processor, and a communications device and wherein at least one asset tracking device in the set of asset tracking devices transmits asset signal data, obtains asset signal data from at least one asset tracking device in the set of asset tracking devices, determines aggregate signal strength data for each of the other asset tracking devices in the set of asset tracking devices based on the obtained asset signal data, and calculates asset position data for every other asset tracking device in the set of asset tracking devices based on the aggregate signal strength data.

In yet another additional embodiment of the invention, each asset tracking device in the set of asset tracking devices is associated with an asset, each asset tracking device in the set of asset tracking devices is connected to a synchronization signal on its associated asset, and the asset signal data includes synchronization data determined based on the synchronization signal.

In still another additional embodiment of the invention, a master asset tracking device in the set of asset tracking devices further includes a location determination device and the master asset tracking device determines absolute position data describing the location of the master asset tracking device using the location determination device and determines asset position data describing the location of the other asset tracking devices in the set of asset tracking devices based on the absolute position data and the asset position data.

In yet still another additional embodiment of the invention, the master asset tracking device further transmits the asset position data to a remote server system.

In yet another embodiment of the invention, the communication device includes a low power radio frequency transceiver and each asset tracking device in the set of asset tracking devices transmits the asset signal data using the communications device.

Still another embodiment of the invention includes a method for determining the location of an asset including obtaining asset signal data using an asset tracking device, where the asset signal strength data includes asset data identifying an asset and the asset tracking device includes a processor, a memory connected to the processor, and a communications device, calculating asset signal strength data based on the obtained asset signal data using the asset tracking device, and determining chained asset data based on the asset signal data and the asset signal strength data using the asset tracking device, where the chained asset data identifies a set of assets chained to a master asset associated with the asset tracking device.

In yet another additional embodiment of the invention, the method further includes determining relative location data for the asset based on the asset signal strength data using the asset tracking device.

In still another additional embodiment of the invention, the method further includes transmitting the chained asset data to a remote server system using the asset tracking device.

DETAILED DESCRIPTION

Figure 1:
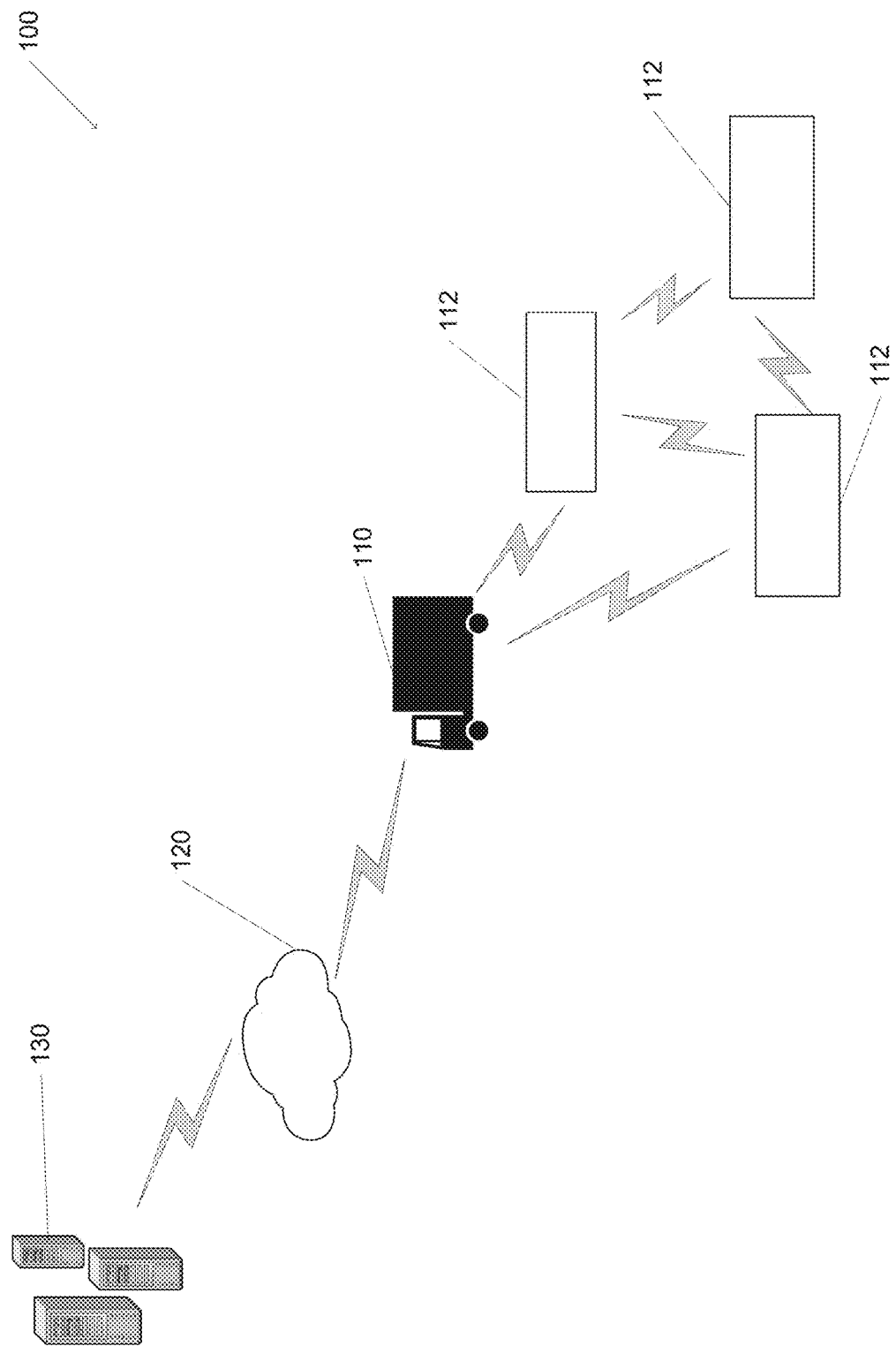
FIG. 1 is a conceptual illustration of an asset tracking system in accordance with an embodiment of the invention.

Turning now to the drawings, systems and methods for locating collocated assets in accordance with embodiments of the invention are disclosed. Locating units can be used to identify the location of assets in a variety of location. Assets can include, but are not limited to, vehicles (e.g. automobiles, tractors, etc. . . . ) and non-locomotive assets (cargo containers, trailers, etc.). Large numbers of assets are often collocated in the same place, such as a storage yard or docking facility, and locating a particular asset can be quite difficult. For example, assets can be tracked using a Global Positioning System (GPS) receiver. However, it is well known that a GPS receiver has a location accuracy of approximately fifteen meters, which can narrow the location of an asset to a particular area but is often not precise enough to locate a specific asset, particularly when assets are stacked together. This problem is further compounded when assets are in transit within the yard. Other locating units, such as RFID tags, can also be employed to locate an asset by using an interrogator to activate the locating devices installed on and identifying an asset. However, these locating units suffer from similar problems, particular when assets are in motion.

Asset tracking devices in accordance with embodiments of the invention can be utilized to track a variety of vehicles and/or assets, particularly in environments where a large number of assets are stored. An asset tracking device can include a variety of communication devices and/or sensor devices. Communication devices can include, but are not limited to, radio transmitters (e.g. a RFID tag, a radio beacon, and/or a Bluetooth beacon) and network communication devices (e.g. a cellular modem). Sensor devices can include, but are not limited, to, input-output (I/O) interfaces, location determination devices (e.g. a GPS receiver), and vehicle diagnostic interfaces. In a variety of embodiments, an asset tracking device can be connected to a diagnostic connector (e.g. an OBD II port) in a vehicle. It should be noted that the asset tracking device affixed to a particular asset can include a different hardware configuration for the particular asset being tracked. For example, an asset tracking device designed to be installed in a vehicle can include a GPS receiver, radio transmitter, and cellular modem and be powered by the vehicle's electrical system, while an asset tracking device affixed to a cargo container may include a battery and a low-power radio transmitter. However, any configuration of hardware can be utilized as appropriate to the requirements of specific applications of embodiments of the invention. The asset tracking devices can receive periodic signals from other asset tracking devices in their vicinity and measure the strength of the received signals along with recording the asset tracking device ID data provided in the periodic signals. The relative position of each asset tracking device can be determined based on the received signal strengths as described in more detail below. In a variety of embodiments, a master asset tracking device can then report its location, along with the location of other asset tracking devices chained to (i.e. grouped with) the master asset tracking device, to a remote server system.

As described above, a variety of assets may be in proximity to each other but not be chained together. Asset tracking devices in accordance with embodiments of the invention can employ a variety of processes to filter asset tracking devices that are within the range of a master asset tracking device but are not associated with an asset in the set of chained assets. In this way, the location of a number of assets can be accurately tracked by filtering unchained assets from the set of chained assets. In several embodiments, one or more asset tracking devices in a group can dynamically determine a master asset tracking device for the group as described in more detail below.

In a variety of embodiments, the operational state of a vehicle is utilized in determining if an asset tracking device can be a master asset tracking device for a group. In a number of embodiments, vehicle ignition state (i.e. the operational status of the vehicle) is ascertained by monitoring the vehicle for signs indicative of the vehicle ignition state without directly connecting to the vehicle ignition line. Information indicative of vehicle ignition state (i.e. vehicle status data) can be ascertained by observing characteristics of the vehicle including but not limited to the power supplied by the vehicle, vehicle vibration, communications on an OBD II or other vehicle data bus line, and/or vehicle position information. In many embodiments, multiple different types of information are combined to ascertain the vehicle ignition state. Systems and methods for using an asset tracking device added to the vehicle after the manufacture of the vehicle without a direct connection to the vehicle ignition line that can be utilized to determine ignition state information in accordance with embodiments of the invention are described in U.S. Pat. No. 8,489,271, titled "Systems and Methods for Virtual Ignition Detection" and issued Jul. 16, 2013, the disclosure of which is hereby incorporated by reference in its entirety.

In accordance with many embodiments of the invention, asset tracking devices can include one or more sensors capable of determining the speed and/or acceleration of the tracked asset. Vehicle speed can be calculated using information provided by a Global Position System (GPS) receiver by dividing the distance traveled by the GPS receiver by the time between measurements taken by the GPS receiver. In several embodiments, the GPS receiver determines velocity information using the signals received by the GPS receiver. A GPS receiver can determine velocity information in a variety of ways in accordance with embodiments of the invention, including, but not limited to, measuring the Doppler shift of the received signals. The differences in speed between measurements taken by the GPS receiver can be used to determine acceleration data for the tracked asset. GPS receivers are also capable of determining the location and/or the heading of the asset utilizing the received signals. A variety of devices other than GPS receivers can be utilized in vehicles to determine information related to the vehicle, such as speed, acceleration, and heading. For example, acceleration information for an asset can be measured using an accelerometer while heading information can be determined using a compass. Vibration information can be determined using acceleration information taken using an acceleration sensor. In several embodiments, asset tracking devices are calibrated to accurately determine speed and/or acceleration data. Systems and methods for calibrating a 3-axis accelerometers that can be utilized to determine vibration information in accordance with a variety of embodiments of the invention are disclosed in U.S. Pat. No. 9,217,757, titled "Systems and Methods for 3-Axis Accelerometer Calibration" and issued Dec. 22, 2015, the entirety of which is hereby incorporated by reference.

Systems and methods for tracking assets using asset tracking devices in accordance with embodiments of the invention are described in more detail below.

Asset Tracking Systems

Asset tracking systems in accordance with embodiments of the invention can accurately determine the location of a variety of locomotive and non-locomotive assets by dynamically determining when particular assets are chained together. A conceptual diagram of an asset tracking system in accordance with an embodiment of the invention is shown in FIG. 1. The asset tracking system 100 includes a master asset tracking device 110 in communicating with a remote server system 130 and a variety of chained asset tracking devices 112 in communication with the master asset tracking device 110. In a variety of embodiments, the master asset tracking device 110 communicates with the remote server system 130 via a network 120. In a variety of embodiments, the network 120 is the Internet. In many embodiments, the network 120 is any wired or wireless network, such as a cellular network, between the master asset tracking device 110 and the remote server system 130. In a number of embodiments, the remote server system 130 implemented using a single server system. In several embodiments, the remote server system 130 is implemented using multiple server systems.

In a variety of embodiments, the master asset tracking device 110 and/or the chained asset tracking devices 112 is installed in a vehicle having a vehicle data bus. In several embodiments, the asset tracking devices are connected to a vehicle diagnostic connector that provides access to the vehicle data bus. The asset tracking devices can obtain data from any of a variety of vehicle devices connected to the vehicle data bus utilizing any of a variety of techniques as appropriate to the requirements of specific applications of embodiments of the invention. Vehicle devices can include, but are not limited to, engine sensors, electronic control unit (ECU) devices, alternator sensors, vibration sensors, voltage sensors, oxygen sensors, Global Positioning System (GPS) receivers, ignition devices, weight sensors, and/or acceleration determination devices. Systems and methods for connecting to a vehicle data bus that can be utilized in accordance with embodiments of the invention are described in SAE J1978, titled "OBD II Scan Tool," first published by SAE International of Troy, Mich. on Mar. 1, 1992 and last updated Apr. 30, 2002. Systems and methods for obtaining data from devices connected to a vehicle data bus are described in SAE J1979, titled "E/E Diagnostic Test Modes," first published by SAE International on Dec. 1, 1991 and last updated Aug. 11, 2014. The disclosures of SAE J1978 and SAE J1979 are hereby incorporated by reference in their entirety. In a number of embodiments, the asset tracking devices are connected directly to one or more sensors within an asset and/or does not utilize a vehicle data bus.

Asset tracking devices can include any of a variety of sensors and/or devices, including those described above with respect to the vehicle data bus and those described in more detail below, to obtain data regarding the status of the vehicle. This data can be utilized in a variety of location determination processes to determine the location of one or more assets as described in more detail below. Asset tracking devices can also communicate with any of a variety of sensors and/or devices (such as other asset tracking devices) using an input-output (I/O) interface. I/O interfaces can be any connection, including wired and wireless connections, as appropriate to the requirements of specific applications of embodiments of the invention. In a variety of embodiments, the I/O interface includes a low-power radio frequency transceiver, such as a Bluetooth Low Energy radio. In several embodiments, asset tracking devices are capable of executing scripts to read data and/or perform particular processes. These scripts can be pre-loaded on the device and/or obtained from the remote server system 130, vehicle data bus, and/or the I/O interface as appropriate to the requirements of specific applications of embodiments of the invention. Asset tracking devices can be self-powered and/or connected into the electrical system of the vehicle (or other asset) in which the asset tracking device is installed. In a variety of embodiments, the asset tracking device is powered via a vehicle data bus and/or a I/O interface. In many embodiments, asset tracking devices utilize a Global Positioning System (GPS) receiver in order to determine the location, speed, and/or acceleration of the asset in which the asset tracking device is installed. However, it should be noted that any location-determining techniques, such as cellular tower triangulation, wireless network geolocation techniques, and dead reckoning techniques, could be utilized as appropriate to the requirements of specific applications of embodiments of the invention.

In a variety of embodiments, asset tracking devices and/or the remote server system 130 provides a user interface allowing for visualizing and interacting with the data. In several embodiments, the asset tracking devices and/or remote server system 130 provides an interface, such as an application programming interface (API) or web service that provides some or all of the data to third-party systems for further processing. Access to the interface can be open and/or secured using any of a variety of techniques, such as by using client authorization keys, as appropriate to the requirements of specific applications of the invention.

Although a specific architecture of an asset tracking system in accordance with embodiments of the invention are discussed above and illustrated in FIG. 1, a variety of architectures, including sensors and other devices and techniques not specifically described above, can be utilized in accordance with embodiments of the invention. Furthermore, the processes described herein can be performed using any combination the asset tracking devices and/or the remote server systems as appropriate to the requirements of specific applications of embodiments of the invention.

Asset Tracking Devices and Remote Server Systems

Figure 2A:
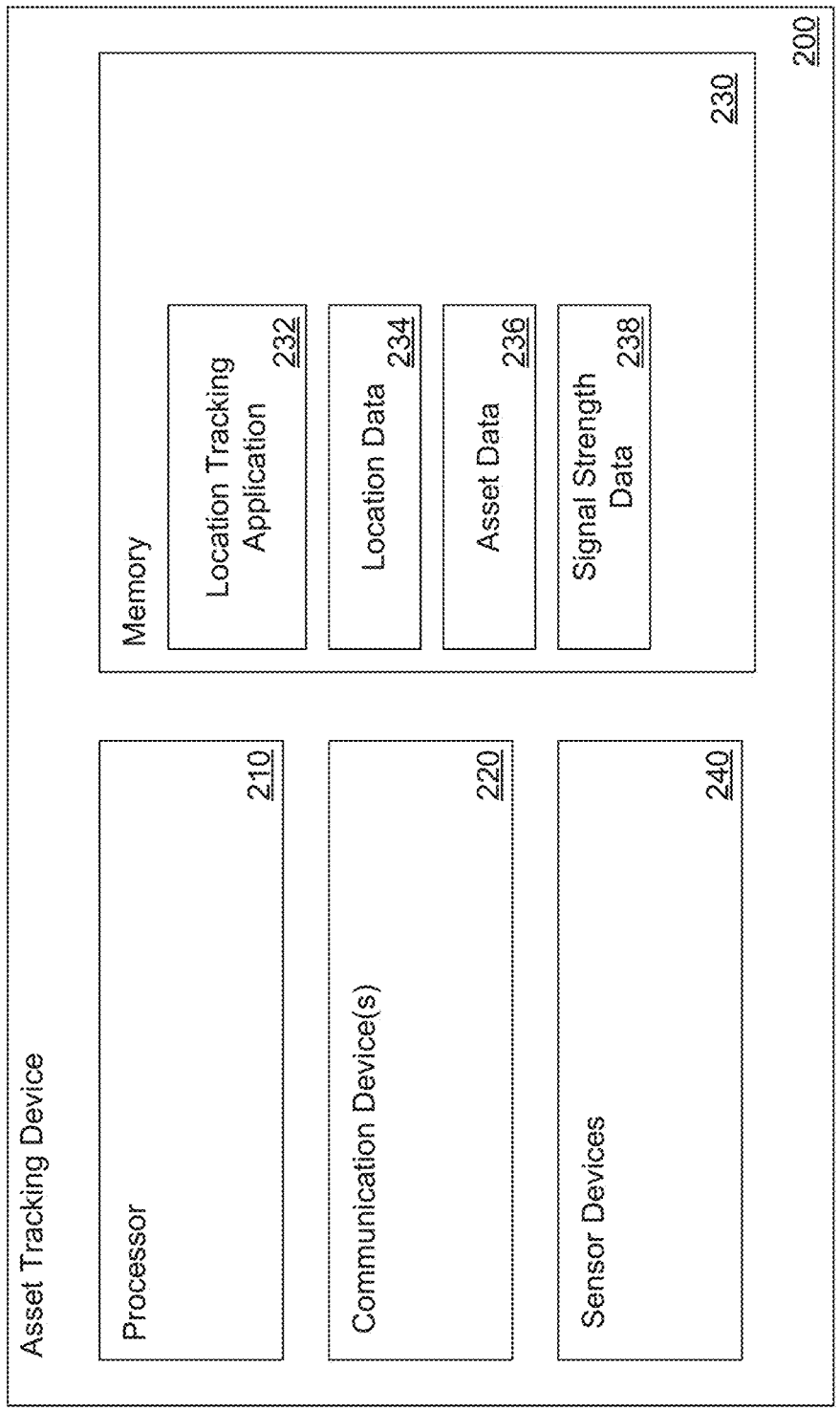
FIG. 2A is a conceptual illustration of an asset tracking device in accordance with an embodiment of the invention.

Asset tracking devices in accordance with embodiments of the invention can dynamically chain themselves together based on the proximity of their associated assets and calculate the location of those assets. A conceptual illustration of an asset tracking device in accordance with an embodiment of the invention is shown in FIG. 2A. The asset tracking device 200 includes a processor 210 in communication with memory 230. The asset tracking device 200 can also include one or more communication devices 220 capable of sending and receiving data. In a number of embodiments, the communication devices 220 are in communication with the processor 210, the memory 230, and/or the sensor device(s) 240. In several embodiments, the memory 230 is any form of storage storing a variety of data, including, but not limited to, a locating tracking application 232, location data 234, asset data 236, and/or signal strength data 238. In many embodiments, the locating tracking application 232, location data 234, asset data 236, and/or signal strength data 238 are stored using an external server system and received using the communication devices 220. Sensor devices 240 can include RPM sensors, voltage sensors, GPS receivers, noise sensors, vibration sensors, acceleration sensors, weight sensors, and any other device capable of measuring data regarding an asset as appropriate to the requirements of specific applications of embodiments of the invention. Sensor devices 240 can be included within the asset tracking device 200 and/or located external to the asset tracking device 200. The asset tracking device 200 can communicate with external sensor devices using the communication devices 220, such as via a vehicle data bus, RF connection, and/or a network connection as appropriate to the requirements of specific applications of embodiments of the invention.

Figure 2B:
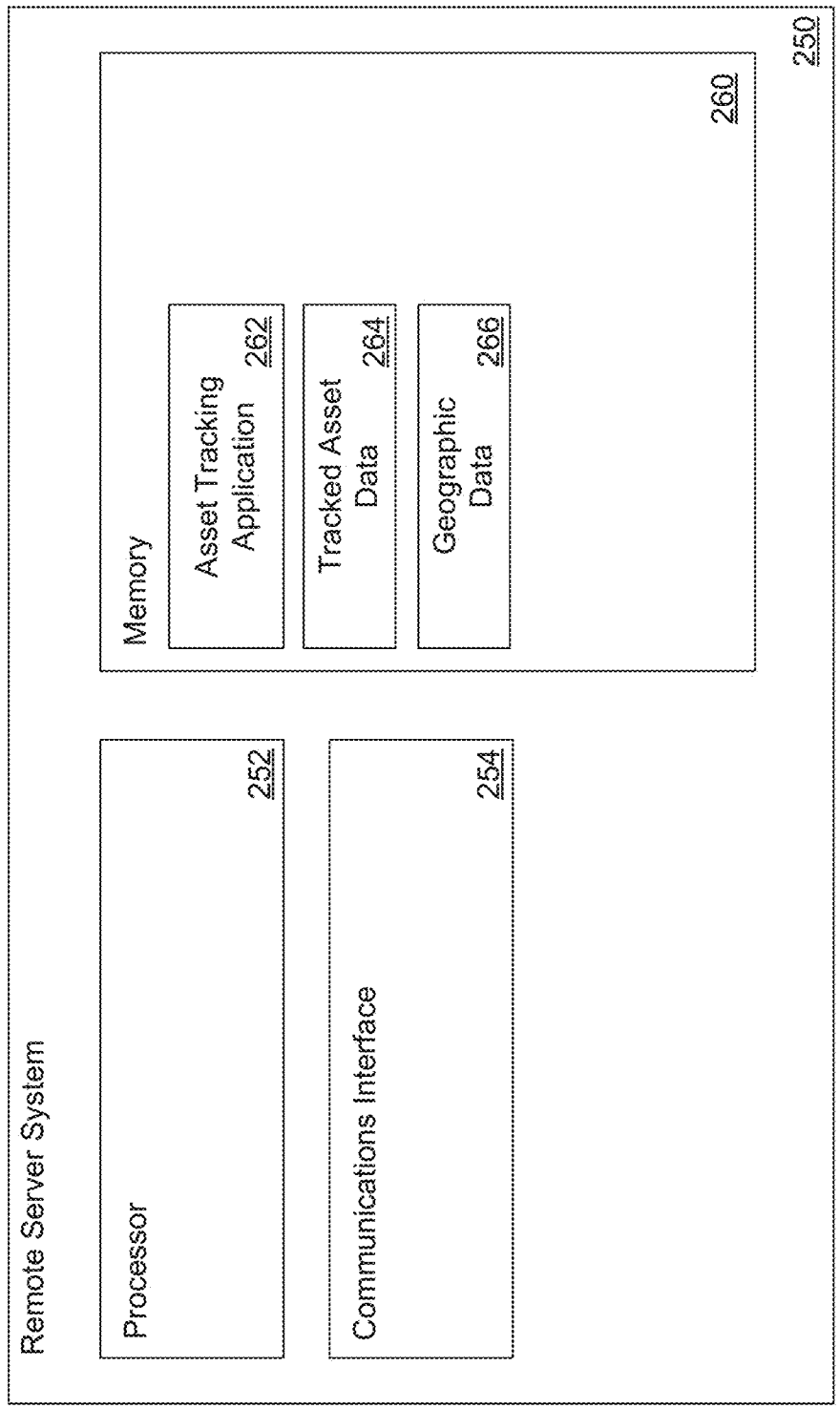
FIG. 2B is a conceptual illustration of a remote server system in accordance with an embodiment of the invention.

Remote server systems in accordance with embodiments of the invention can request, obtain, and track data regarding the location of one or more assets. A conceptual illustration of a remote server system in accordance with an embodiment of the invention is shown in FIG. 2B. The remote server system 250 includes a processor 252 in communication with memory 260. The remote server system 250 can also include one or more communication interfaces 254 capable of sending and receiving data. In a number of embodiments, the communication interface 254 is in communication with the processor 252 and/or the memory 260. In several embodiments, the memory 260 is any form of storage configured to store a variety of data, including, but not limited to, an asset tracking application 262, tracked asset data 264, and/or geographic data 266. In many embodiments, the asset tracking application 262, tracked asset data 264, and/or geographic data 266 are stored using an external server system and received by the remote server system 250 using the I/O interface 254.

The processor 210 and processor 252 can be directed, by the location tracking application 232 and the asset tracking application 262 respectively, to perform a variety of asset tracking processes. A number of asset tracking processes that can be performed in accordance with embodiments of the invention are described in more detail below.

Although specific architectures for asset tracking devices and remote server systems in accordance with embodiments of the invention are conceptually illustrated in FIGS. 2A-B, any of a variety of architectures, including those that store data or applications on disk or some other form of storage and are loaded into memory at runtime, can also be utilized. Additionally, any of the data utilized in the system can be cached and transmitted once a network connection (such as a wireless network connection via the communications device or I/O interface) becomes available. In a variety of embodiments, a memory includes circuitry such as, but not limited to, memory cells constructed using transistors, that are configured to store instructions. Similarly, a processor can include logic gates formed from transistors (or any other device) that dynamically perform actions based on the instructions stored in the memory. In several embodiments, the instructions are embodied in a configuration of logic gates within the processor to implement and/or perform actions described by the instructions. In this way, the systems and methods described herein can be performed utilizing both general-purpose computing hardware and by single-purpose devices.

Chaining and Locating Asset Tracking Devices

A number of asset tracking processes include dynamically chaining (i.e. grouping) a number of assets together based on the proximity of those assets to each other. For example, a number of cargo containers can be attached to a tractor and moved throughout a storage yard. The tractors and the attached cargo containers can constitute a set of chained assets. Similarly, a number of assets stored in the same section of a warehouse can constitute a set of chained assets. Each of the assets can be associated with at least one asset tracking device. Asset tracking devices can transmit and receive signals including asset data identifying the asset tracking device and/or asset. The strength of the received signals can be measured and signal strength data describing the received signal strength along with the corresponding asset data can be generated. The asset tracking devices can collect the asset data and signal strength data and report the collected data along with its own asset data to a central device, such as a master asset tracking device or a remote server system, as appropriate to the requirements of specific applications of embodiments of the invention.

Asset tracking processes can also include determining the location of one or more assets based on the location of the asset tracking device associated with the particular asset. A central device can calculate the relative position of each asset tracking device in a particular set of chained asset tracking device based on the reported signal strength data for each of the chained asset tracking devices. That is, the relative location of a first asset tracking device from a second asset tracking device can be calculated based on the frequency of the signal transmitted from the first asset tracking device to the second asset tracking device, the broadcast strength of the signal, and/or the strength of that signal as received by the second asset tracking device. In several embodiments, the relative location can also be calculated based on the geometry of the antenna used to transmit and/or receive the signal, radiation resistance, and any other factors as appropriate to the requirements of specific applications of embodiments of the invention. In many embodiments, one or more of the asset tracking devices obtain location data describing its location, such as by using a GPS receiver to determine its location. The set of chained asset tracking devices can then be utilized to determine a set of chained assets, where the chained assets include those assets associated with the chained asset tracking devices.

In addition to determining which assets are chained together, the signal strength data and/or relative location information can be utilized to determine a relative ordering of assets within a set of chained assets. For example, two or more trailers may be hooked in series to a single tractor and be moving through a storage facility. In this example, it can be important to know which trailer is at the end of the chain as that trailer will need to be decoupled from the set of chained assets before assets nearer to the tractor can be accessed. In many embodiments, the relative ordering of the assets within a set of chained assets can be determined relative to a master asset tracking device based on the received signal strength for each of the asset tracking devices attached to the assets. By ordering the asset tracking devices by received signal strength, the asset tracking device with the weakest received signal strength is likely associated with the asset at the end of the set of chained assets. Similarly, the asset tracking device having the strongest received signal strength is likely closest to the master tracking device and therefore at the start of the set of chained assets. However, it should be noted that, in a variety of embodiments, the material and/or construction of an asset and/or any of the factors affecting signal strength described above can have an effect on the received signal strength for the particular asset tracking device for that asset. It should be noted that any of a variety of weightings can be applied to the received signal strength to correct for these issues in order to refine the ordering of asset tracking devices by received signal strength as appropriate to the requirements of specific applications of embodiments of the invention.

Figure 3A:
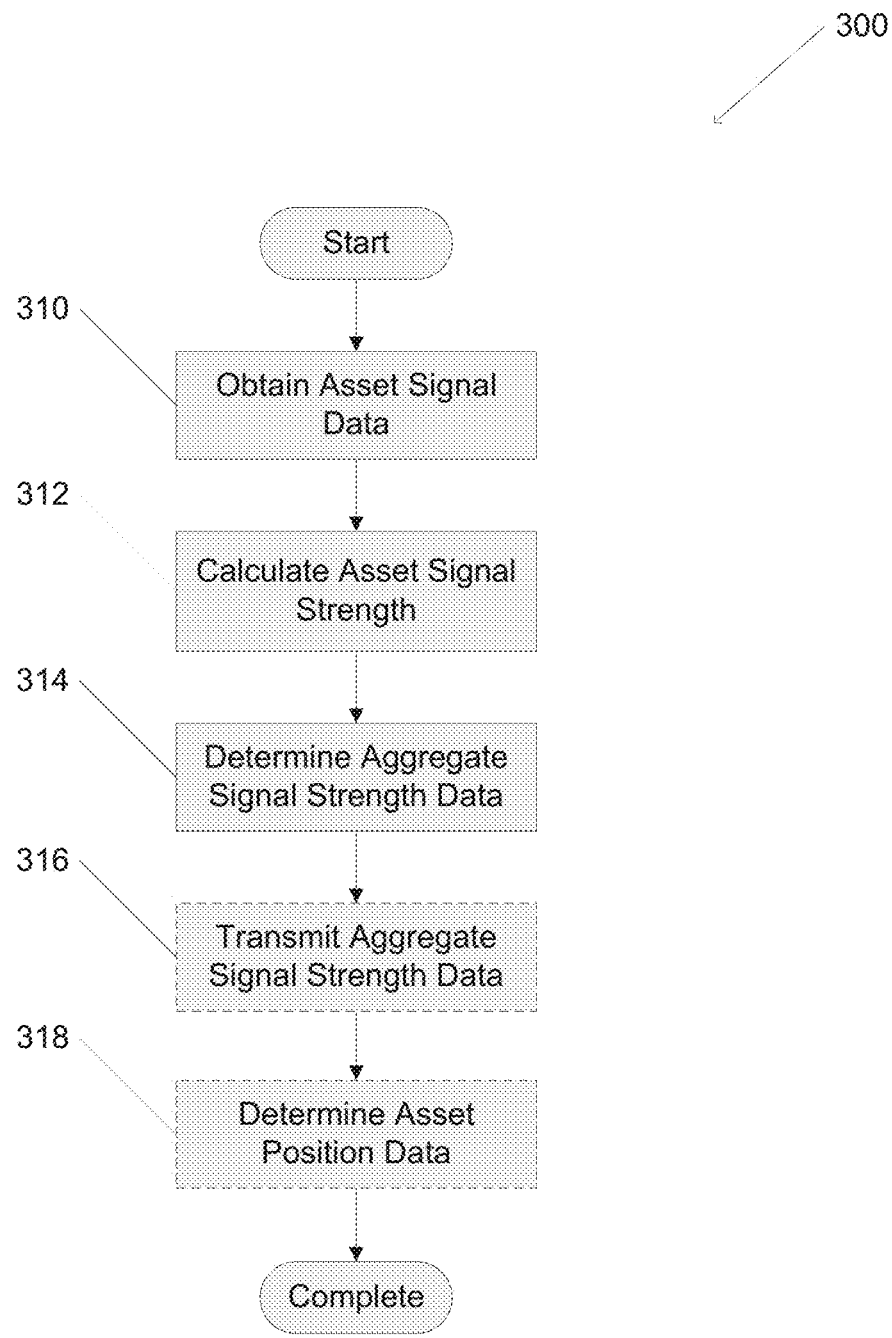
FIG. 3A is a flow chart illustrating a process for chaining asset tracking devices in accordance with an embodiment of the invention.

Turning now to FIG. 3A, a process for chaining asset tracking devices in accordance with an embodiment of the invention is shown. The process 300 includes obtaining (310) asset signal data, calculating (312) asset signal strength, determining (314) aggregate signal strength data, and, in many embodiments, transmitting (316) aggregate signal strength data and/or determining (318) asset position data.

The relative location of one asset tracking device to another asset tracking device, as described above, can be used to define a circular region with a radius of the distance between the two asset tracking devices. That is, the received signal strength can be used to indicate a set of potential locations for the asset tracking devices, but may not provide the absolute location of the asset tracking devices given the distance. However, a variety of processes can be utilized in accordance with embodiments of the invention to determine the absolute location of an asset tracking device given the relative location. In a variety of embodiments, one or more asset tracking devices are fixed in a known position. These fixed asset tracking devices can be utilized to provide an absolute location for a particular asset tracking device using any of a variety of location determination techniques, such as location triangulation, as appropriate to the requirements of specific applications of embodiments of the invention. In several embodiments, the signal strength for a particular asset tracking device can be received from two or more other asset tracking devices in the set of chained asset tracking devices. These signal strengths can be utilized to calculate a number of radial regions in which the particular asset tracking device can be located relative to the other asset tracking devices in the set of chained asset tracking devices. A variety of techniques, such as multilateration or trilateration, can be utilized to calculate the location of the asset tracking devices as appropriate to the requirements of specific applications of embodiments of the invention.

Figure 3B:
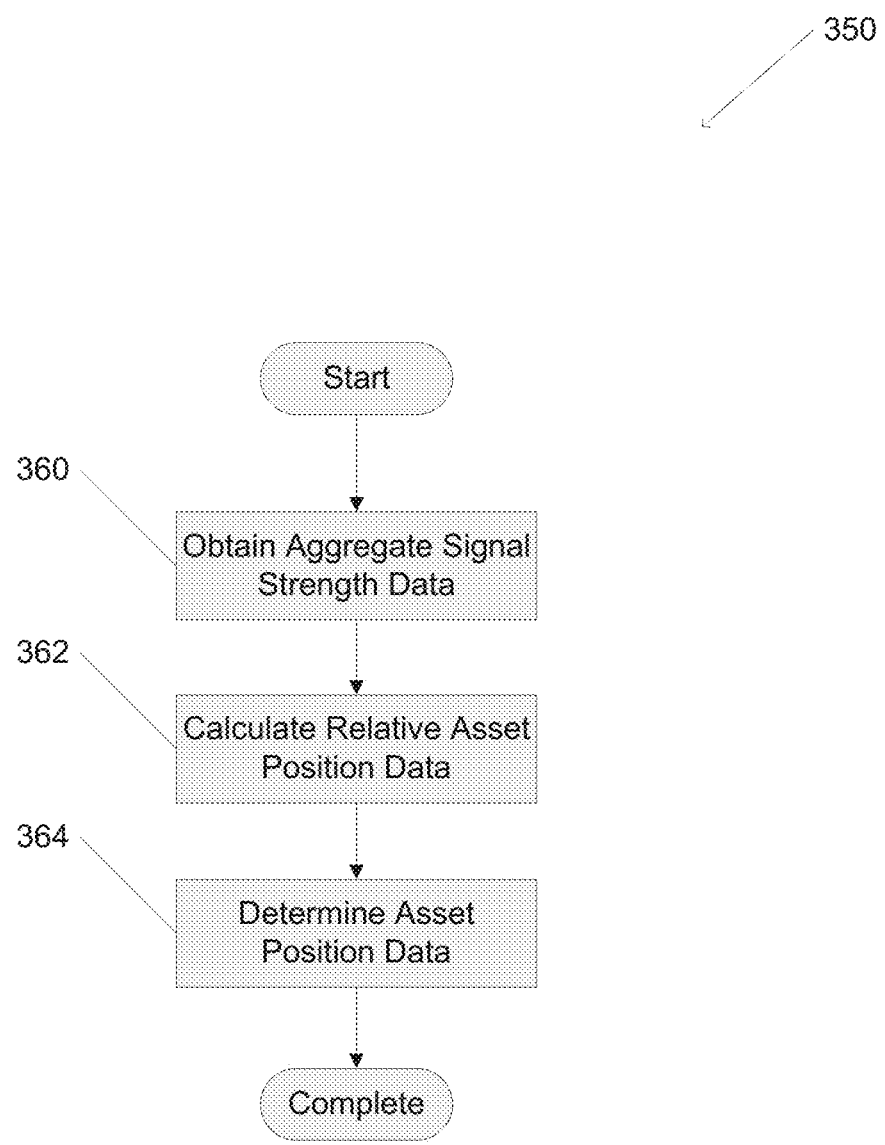
FIG. 3B is a flow chart illustrating a process for determining the location of one or more asset tracking devices in accordance with an embodiment of the invention.

Turning now to FIG. 3B, a process for locating tracked assets in accordance with an embodiment of the invention is shown. The process 350 includes obtaining (360) aggregate signal strength data, calculating (362) relative asset position data, and determining (364) asset position data.

In many embodiments, the asset tracking processes include determining asset position data by combining the asset position data with geographic data describing the geography of a particular region, such as a storage facility. However, it should be noted that any region can be described using the geographic data as appropriate to the requirements of specific applications of embodiments of the invention. In a variety of embodiments, the geographic data includes the location of fixed asset tracking devices that can be utilized to determine absolute position data for one or more assets as described herein. In several embodiments, the geographic data and the asset position data can be utilized to generate user interface data that can be used to visualize the location of one or more assets within the geographic region.

Figure 3C:
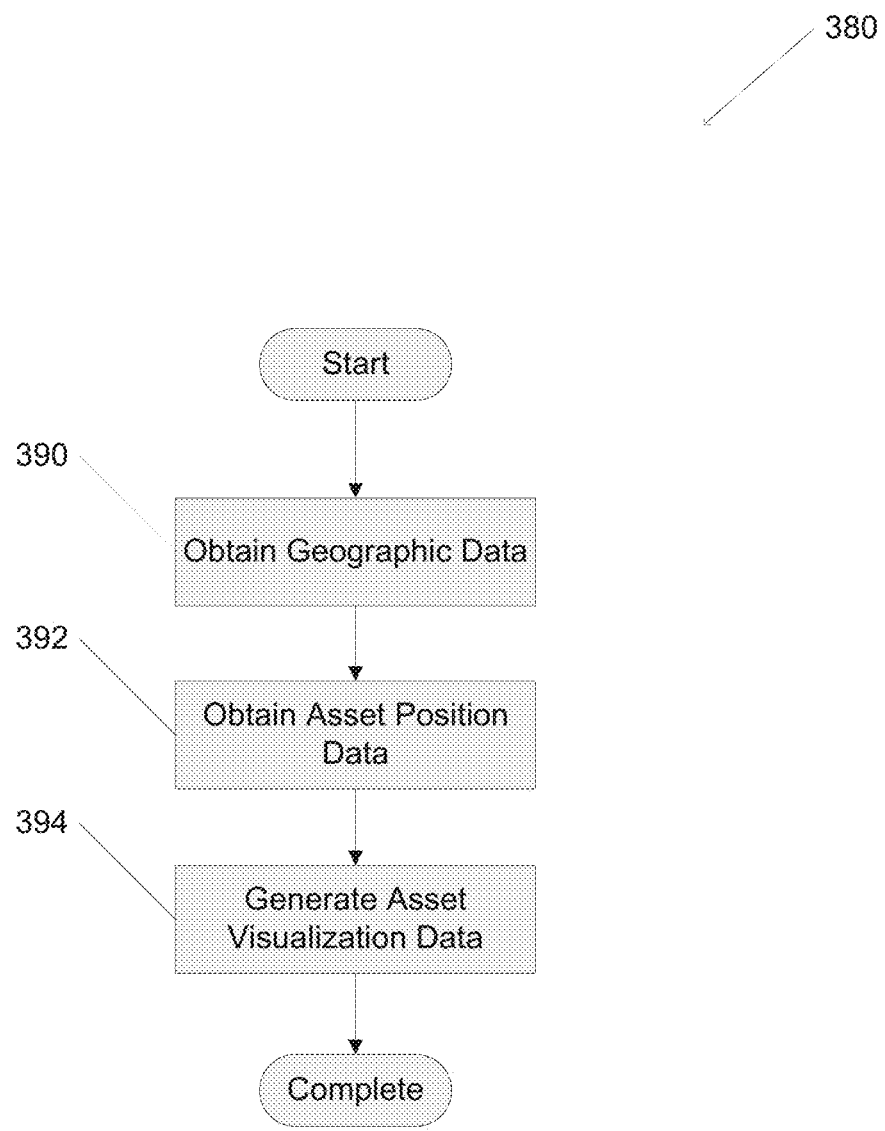
FIG. 3C is a flow chart illustrating a process for visualizing the location of one or more assets in accordance with an embodiment of the invention.

Turning now to FIG. 3C, a process for visualizing the location of one or more assets is shown. The process 380 includes obtaining (390) geographic data, obtaining (392) asset position data, and generating (394) asset visualization data.

Specific processes for chaining and locating asset tracking devices along with visualizing the associated assets in accordance with embodiments of the invention are described above and shown with respect to FIGS. 3A-C; however, any number of processes, including those that utilize different combinations of data than the examples described above, can be utilized as appropriate to the requirements of a specific application in accordance with embodiments of the invention. Techniques for determining particular assets that have been grouped together in accordance with embodiments of the invention are described in more detail below.

Filtering Unchained Assets

Assets are often positioned in close proximity to one another such that when a set of chained assets is in motion, the asset location devices of adjacent or nearby assets (i.e. transient assets) can be picked up by the asset location devices in the set of chained assets. Asset tracking processes in accordance with embodiments of the invention include identifying these nearby but unchained assets and filtering those assets from the set of chained assets. That is, as the set of chained assets moves, the signal strength measurements reported to and collected by the master asset tracking device will indicate relative consistency for those asset tracking devices whose assets are part of the set of chained assets and will indicate variations for those transient asset tracking devices whose assets are not part of the set of chained assets. In this way, low pass filters can be applied to the signals generated based on the transience of the assets to identify those assets that are chained and those that are transient.

Consistency in signal strength can be determined using a variety of processes. For example, a master asset tracking device can maintain counter data for each signal received indicating the number of times a signal from a particular asset tracking device is received. A threshold value can be used to determine when the particular asset tracking device has been in proximity to the master asset tracking device for a sufficient amount of time to determine that the assets have been chained together. Those signals received by the master asset tracking device that do not have an associated counter exceeding the threshold value can be considered to be associated with transient assets that are not part of the set of chained assets. Similarly, when the counter for a particular asset tracking device exceeds the threshold value, the associated asset can then be considered part of the set of chained assets.

The determination of if an asset is transient can include tracking the elapsed time since a signal has been received from an asset tracking device. By way of example, a master asset tracking device can maintain timestamp data describing when a signal is received from an asset tracking device. The master asset tracking device can then use the timestamps to determine when a particular asset tracking device has been seen. A time-based threshold can be applied to the timestamp to determine when a particular asset tracking device has not been seen for a period of time, indicating that it is not associated with an asset in the set of chained assets. Likewise, those signals that have been received within a certain period of time may indicate those assets that have recently appeared and may be associated with assets that are not part of the set of chained assets. In this way, a master asset tracking device can filter those devices that have been seen too recently (e.g. for less than five seconds) and/or not recently enough (e.g. for more than 5 minutes) from the set of chained assets.

Threshold values utilized in the asset tracking processes can be fixed and/or determined dynamically based on any of a variety of factors, including (but not limited to) the transmission rate of the asset tracking devices, the number of asset tracking devices in proximity, the speed at which the asset tracking devices are moving, and/or the presence of a synchronization signal as appropriate to the requirements of specific applications of embodiments of the invention.

Figure 4:
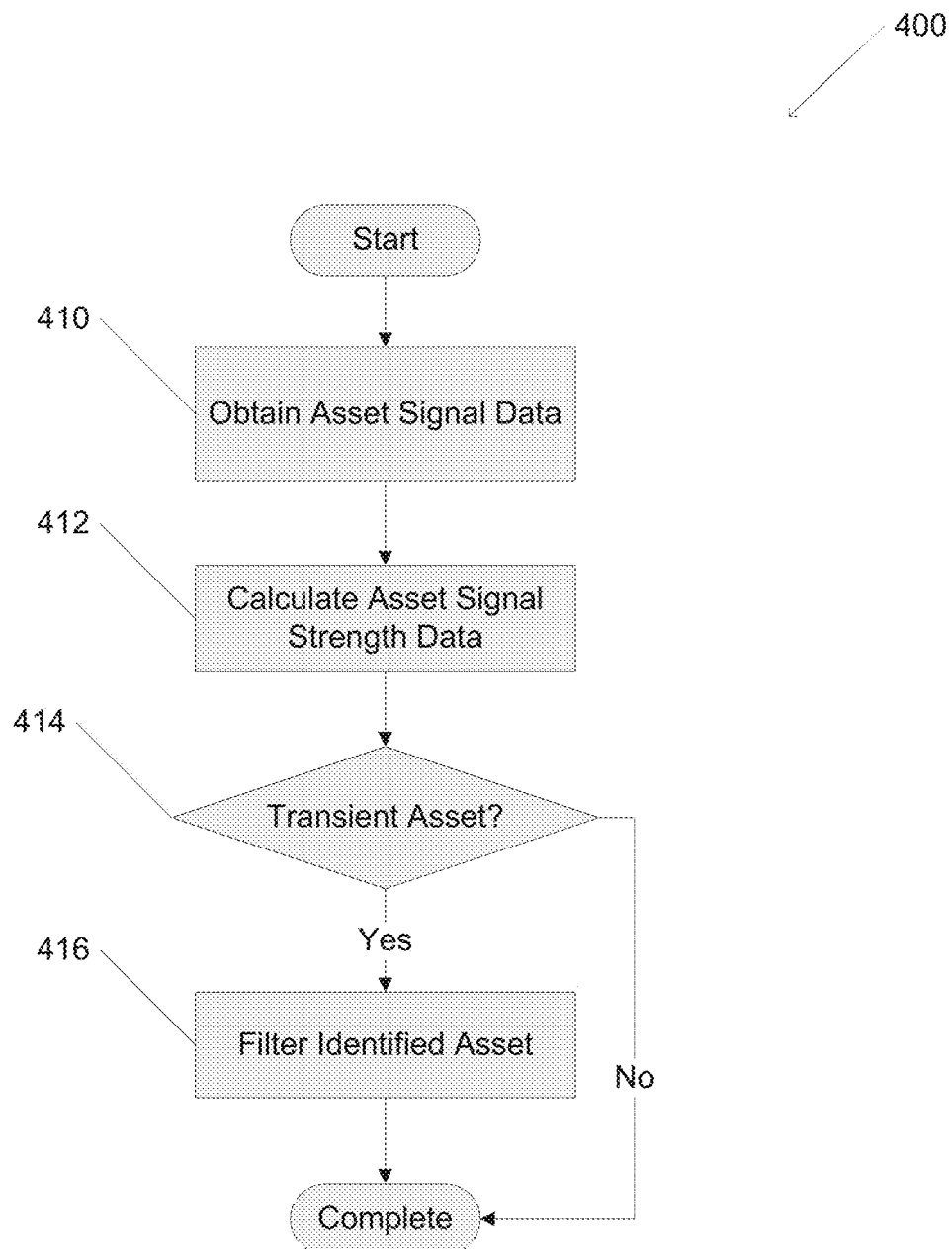
FIG. 4 is a flow chart illustrating a process for filtering unchained asset tracking devices in accordance with an embodiment of the invention.

Turning now to FIG. 4, a process for filtering unchained assets in accordance with an embodiment of the invention is shown. The process 400 includes obtaining (410) asset signal data, calculating (412) asset signal strength data, and determining (414) if particular assets are transient. If an asset is identified as transient, it is filtered (416) from the database of chained assets.

Although specific processes for filtering unchained assets in accordance with embodiments of the invention are described above and shown with respect to FIG. 4, any number of processes, including those that use alternative criteria for determining if an asset is transient from the perspective of the asset tracking device, can be utilized as appropriate to the requirements of a specific application in accordance with embodiments of the invention.

Synchronizing Asset Tracking Devices

Assets that are present in a set of chained assets are often physically connected. For example, many assets have lighting systems that are connected together when the assets are chained. Asset tracking processes in accordance with embodiments of the invention can include determining when assets are chained together based on synchronization data common to the chained assets. In a variety of embodiments, synchronization data can be included in the asset signal data. The master asset tracking device can then use the synchronization data to determine if a particular asset tracking device is associated with a chained asset based on the presentence and/or value of the synchronization data. The synchronization data can include any data captured from an asset, such as voltage data, ignition state data, speed data, and/or any other data as appropriate to the requirements of specific applications of embodiments of the invention. In several embodiments, an asset tracking device includes one or more sensor devices that are coupled to systems within the asset in order to obtain data describing the state of those systems.

For example, a set of chained assets can have their brake lighting systems connected so that when the brakes are applied on one asset it causes the brake lights to activate on all of the connected assets. An asset tracking device can be coupled to the brake lighting system within the assets using a sensor device (i.e. a sensor interface), thereby allowing the asset tracking devices to measure the voltage present in the brake lighting system on each asset. The voltage of the brake light system can be used as the synchronization data as each of the chained assets will have their brake lights operating in concert. By way of a second example, each asset tracking device can have a synchronization counter that (re)starts on receipt of the synchronization criteria (i.e. the brake light voltage of the instant example). The synchronization data can include the counter data and the master asset tracking device can compare the counter data received from a particular asset tracking device to its own counter to determine if the asset tracking devices are both measuring the synchronization signal (i.e. the brake light voltage in the instant example). If the counters match (either exactly or within a threshold value), the assets are chained, otherwise if the counters do not match then the assets are not chained and the particular asset can be filtered from the set of chained assets.

In several embodiments, the synchronization data can be utilized to determine the relative ordering of assets within a set of chained assets utilizing processes similar to those described above. For example, in embodiments using counters to determine if asset tracking devices are synchronized, assets can be considered to be chained if their counters are within a threshold value of each other and the value of the counters can be utilized to order the asset tracking devices. For example, a signal can be utilized to synchronize the counters and, due to a variety of effects such as signal propagation delays, it is likely that the asset tracking devices located on assets near the end of the chain of assets will initialize their counters at a later time than those asset tracking devices associated with assets at the front of the chain of assets. In this way, those asset tracking devices reporting lower counter values (as the counter started later in time) are further away from the master asset tracking devices than those asset tracking devices reporting higher counter values. Similarly, in those embodiments utilizing a voltage measurement, the asset tracking devices at the end of the chain can read a lower voltage than those asset tracking devices at the beginning of the chain due to increased resistance as the length of the chain increases. However, it should be noted that any synchronization data can be utilized to determine a relative ordering of asset tracking devices (and their associated assets) within a set of chained assets utilizing any of a variety of techniques as appropriate to the requirements of specific applications of embodiments of the invention.

Figure 5:
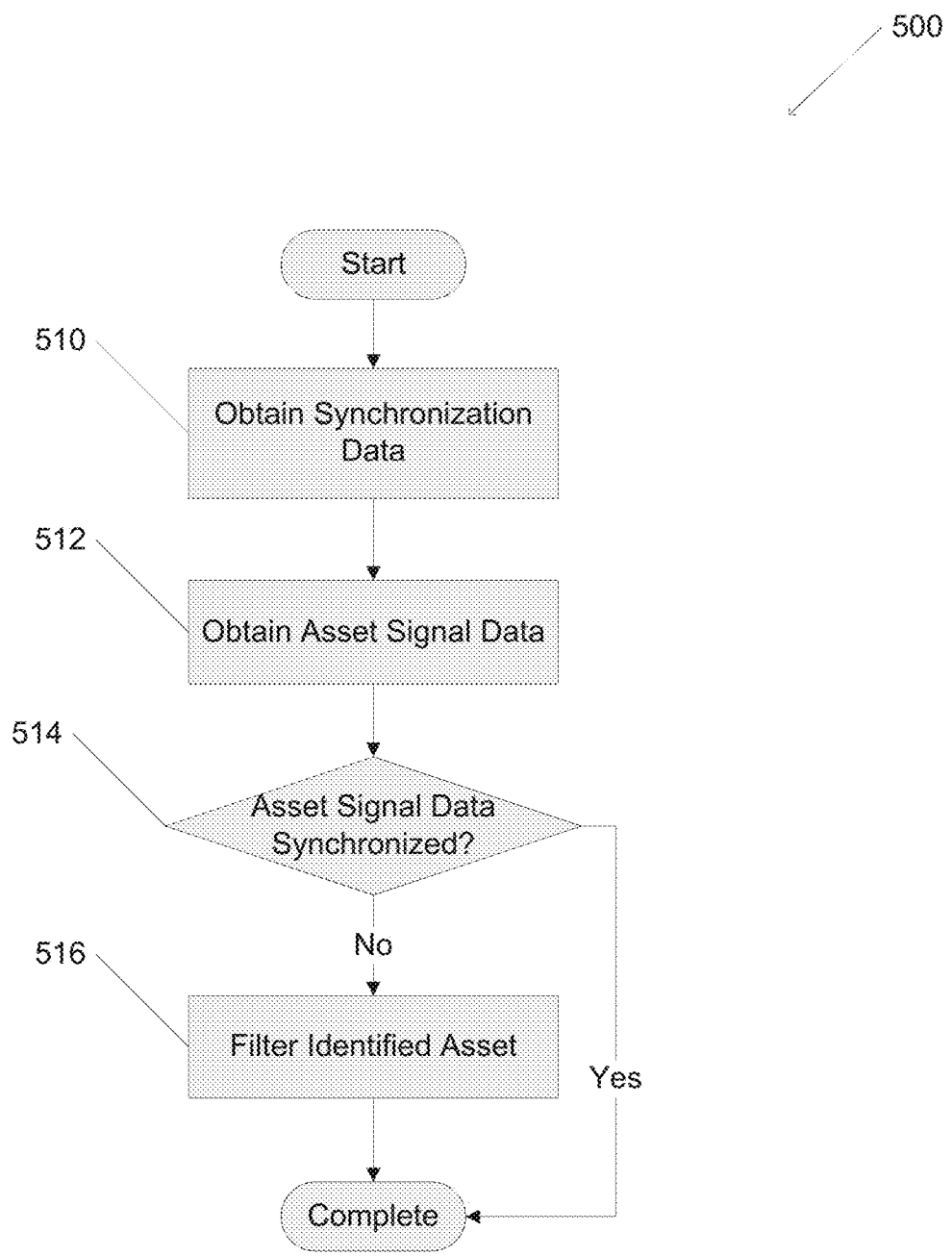
FIG. 5 is a flow chart illustrating a process for synchronizing asset tracking devices in accordance with an embodiment of the invention.

Turning now to FIG. 5, a process for synchronizing asset tracking devices in accordance with an embodiment of the invention is shown. The process 500 includes obtaining (510) synchronization data, obtaining (512) asset signal data, and determining if asset signal data is synchronized (514). If the asset signal data is not synchronized (514), the identified asset is filtered (516).

Although specific processes for synchronizing asset tracking devices in accordance with embodiments of the invention are described above and shown with respect to FIG. 5, any number of processes, including those that utilize alternative data to synchronize asset tracking devices, can be utilized as appropriate to the requirements of a specific application in accordance with embodiments of the invention.

Improving Asset Tracking Device Performance

If assets are traveling together as a group, it can be more efficient for a single asset tracking device to maintain the group's position and/or provide the location data to a remote server system over a wide area network than it is for each asset location device to report its own position and/or collect absolute positioning data. Asset tracking processes in accordance with embodiments of the invention can include determining master asset tracking devices to provide centralized reporting of location data for the set of chained assets. In a variety of embodiments, for a set of asset tracking devices, the responsibility of the master asset tracking device for the set can be spread around the entire population of the set to distribute battery consumption across the asset tracking devices. Any of a variety of techniques, such as round robin selection processes, processes utilizing the remaining battery power of one or more asset tracking devices, and processes that select a master asset tracking device based on the capabilities of the asset tracking devices can be utilized as appropriate to the requirements of specific applications of embodiments of the invention. In several embodiments, a single device is selected as the master asset tracking device for the set of asset tracking devices.

For example, a master asset tracking device can utilize a GPS receiver to determine absolute location data. By utilizing a single master tracking device, the time and power overhead of the GPS position determination processes need not be repeated on multiple devices, thereby reducing the power consumption of the set as a whole. By way of a second example, a first asset tracking device may be installed in an asset having a large power supply (such as a tractor having a vehicle battery and/or alternator). Other asset tracking devices in the set can be deployed on assets lacking such power supplies, such as trailers. These asset tracking devices can utilize lower power radios and/or not include higher power components such as GPS receivers and cellular radios. In this example, the first asset tracking device can be selected as the master asset tracking device due to its location on a powered asset and/or its location determination capabilities based on its GPS receiver.

However, it should be noted that any asset tracking device in the set of asset tracking devices can be selected as the master asset tracking device. In many embodiments, multiple asset tracking devices are simultaneously selected as master asset tracking devices for the entire set. For example, one asset tracking device can be selected as a master asset tracking device to determine absolute location data while a second asset tracking device can be selected as a master asset tracking device to report data to a remote server system. It should be noted that any criteria can be utilized to select one or more master asset tracking devices as appropriate to the requirements of specific applications of embodiments of the invention.

Figure 6:
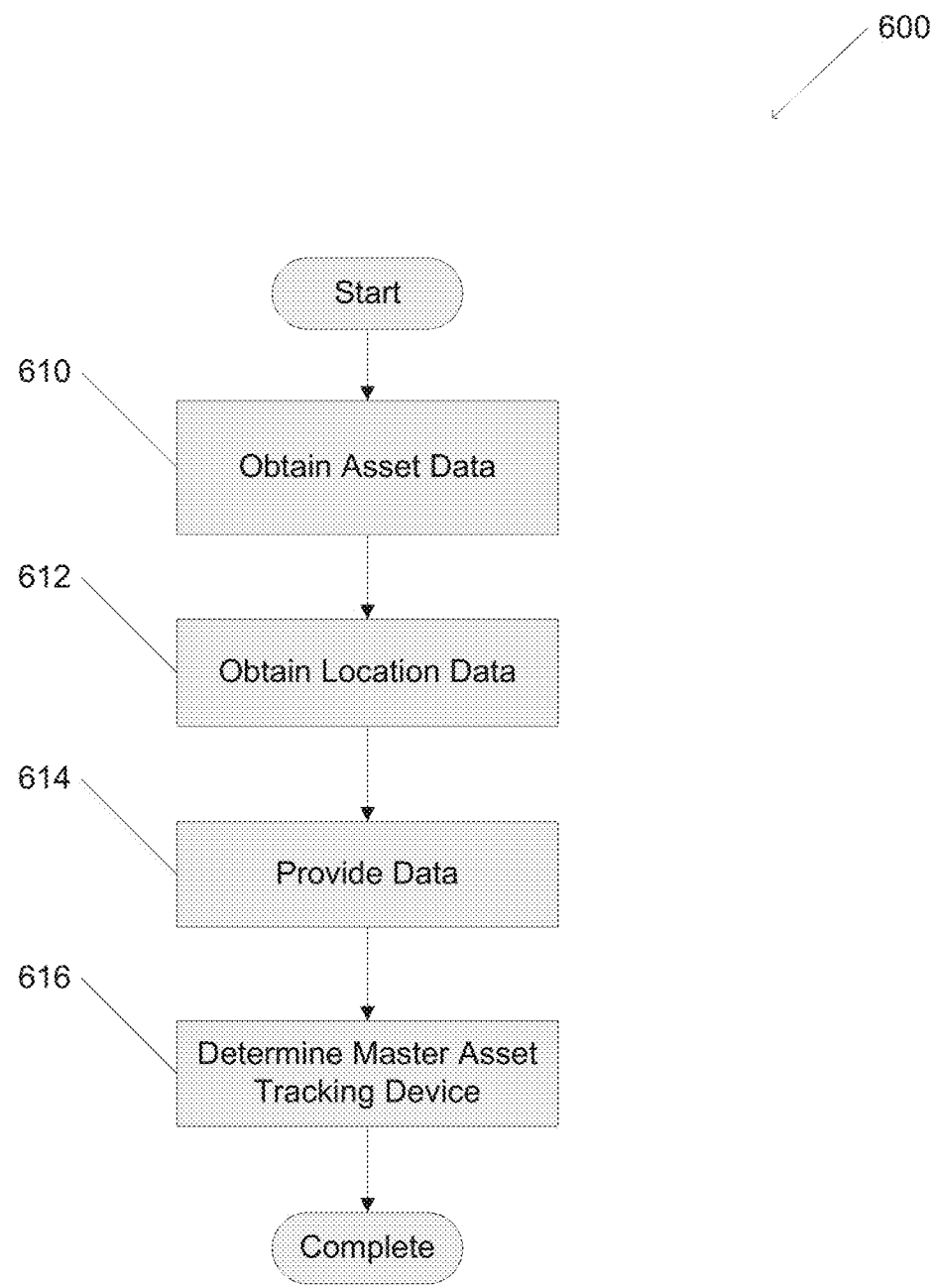
FIG. 6 is a flow chart illustrating a process for minimizing power usage of chained asset tracking devices in accordance with an embodiment of the invention.

Turning now to FIG. 6, a process for improving the performance of asset tracking devices in accordance with an embodiment of the invention is shown. The process 600 includes obtaining (610) asset data, obtaining (612) location data, providing (614) data, and determining (616) a master asset tracking device.

Specific processes for improving the performance of asset tracking systems and asset tracking devices in accordance with embodiments of the invention are described above and shown with respect to FIG. 6; however, any number of processes, including those that utilize alternative criteria for selecting a master asset tracking device and/or those that receive data configuring an asset tracking device to act as the master asset tracking device from a remote server system, can be utilized as appropriate to the requirements of a specific application in accordance with embodiments of the invention.

Although the present invention has been described in certain specific aspects, many additional modifications and variations would be apparent to those skilled in the art. In particular, any of the various processes described above can be performed in alternative sequences and/or in parallel (on the same or on different computing devices) in order to achieve similar results in a manner that is more appropriate to the requirements of a specific application. It is therefore to be understood that the present invention can be practiced otherwise than specifically described without departing from the scope and spirit of the present invention. Thus, embodiments of the present invention should be considered in all respects as illustrative and not restrictive. It will be evident to the person skilled in the art to freely combine several or all of the embodiments discussed here as deemed suitable for a specific application of the invention. Throughout this disclosure, terms like "advantageous", "exemplary" or "preferred" indicate elements or dimensions which are particularly suitable (but not essential) to the invention or an embodiment thereof, and may be modified wherever deemed suitable by the skilled person, except where expressly required. Accordingly, the scope of the invention should be determined not by the embodiments illustrated, but by the appended claims and their equivalents.

What is claimed is:

1. An asset tracking device, comprising:
   a processor;
   a memory connected to the processor; and
   a communications device connected to the processor;
   wherein the processor is configured to:
      obtain asset signal data, where the asset signal data comprises asset data identifying an asset;

calculate asset signal strength data based on the obtained asset signal data; and determine chained asset data based on the asset signal data and the asset signal strength data, where the chained asset data identifies a set of collocated assets chained to a master asset associated with the asset tracking device, wherein the set of collocated assets are identified based on the asset signal strength data;

wherein to determine the chained asset data comprises to determine proximity of the set of collocated assets to each other based on the asset signal strength data and dynamically group the set of collocated assets based on the proximity to each other.

2. The asset tracking device of claim 1, wherein the processor is further configured to determine the location of the asset relative to the asset tracking device based on the asset signal strength data.

3. The asset tracking device of claim 1, wherein:
the asset tracking device further comprises a location determination device connected to the processor; and
the processor is further configured to determine absolute location data using the location determination device.

4. The asset tracking device of claim 3, wherein the processor is further configured to determine the absolute location of the asset based on the absolute location data and the asset signal strength data.

5. The asset tracking device of claim 1, wherein the processor is further configured to transmit the chained asset data to a remote server system using the communications device.

6. The asset tracking device of claim 1, wherein the communications device comprises a cellular modem.

7. The asset tracking device of claim 1, wherein:
the communications device comprises a radio frequency transceiver; and
the asset signal data is received using the communications device.

8. The asset tracking device of claim 7, wherein the radio frequency transceiver comprises a Bluetooth Low Energy radio.

9. The asset tracking device of claim 1, wherein:
the asset signal data further comprises synchronization data; and
the processor is configured to determine the chained asset data based on the synchronization data.

10. The asset tracking device of claim 9, wherein the synchronization data comprises brake lighting system voltage data.

11. The asset tracking device of claim 9, wherein the synchronization data comprises counter data.

12. The asset tracking device of claim 1, wherein:
the asset tracking device comprises a diagnostic connector; and
the asset tracking device is connected to a vehicle diagnostic connector in an asset.

13. An asset tracking system, comprising:
a set of asset tracking devices, wherein each asset tracking device comprises a processor, a memory connected to the processor, and a communications device; and
wherein at least one asset tracking device in the set of asset tracking devices is configured to:
transmit asset signal data;
obtain asset signal data from at least one asset tracking device in the set of asset tracking devices;
determine aggregate signal strength data for each of the other asset tracking devices in the set of asset tracking devices based on the obtained asset signal data; and
calculate asset position data for every other asset tracking device in the set of asset tracking devices based on the aggregate signal strength data, wherein to calculate the asset position data comprises to determine proximity of the set of asset tracking devices to each other based on the aggregate signal strength data.

14. The asset tracking system of claim 13, wherein:
each asset tracking device in the set of asset tracking devices is associated with an asset;
each asset tracking device in the set of asset tracking devices is connected to a synchronization signal on its associated asset; and
the asset signal data comprises synchronization data determined based on the synchronization signal.

15. The asset tracking system of claim 13, wherein:
a master asset tracking device in the set of asset tracking devices further comprises a location determination device; and
the master asset tracking device is configured to:
determine absolute position data describing the location of the master asset tracking device using the location determination device; and
determine asset position data describing the location of the other asset tracking devices in the set of asset tracking devices based on the absolute position data and the asset position data.

16. The asset tracking system of claim 15, wherein the master asset tracking device is further configured to transmit the asset position data to a remote server system.

17. The asset tracking system of claim 13, wherein:
the communication device comprises a low power radio frequency transceiver; and
each asset tracking device in the set of asset tracking devices is further configured to transmit the asset signal data using the communications device.

18. A method for determining the location of an asset, comprising:
obtaining asset signal data using an asset tracking device, where the asset signal data comprises asset data identifying an asset and the asset tracking device comprises a processor, a memory connected to the processor, and a communications device;
calculating asset signal strength data based on the obtained asset signal data using the asset tracking device; and
determining chained asset data based on the asset signal data and the asset signal strength data using the asset tracking device, where the chained asset data identifies a set of collocated assets chained to a master asset associated with the asset tracking device, wherein the set of collocated assets are identified based on the asset signal strength data;
wherein determining the chained asset data comprises determining proximity of the set of collocated assets to each other based on the asset signal strength data and dynamically grouping the set of collocated assets based on the proximity to each other.

19. The method of claim 18, further comprising determining relative location data for the asset based on the asset signal strength data using the asset tracking device.

20. The method of claim 18, further comprising transmitting the chained asset data to a remote server system using the asset tracking device.

* * * * *